(12) United States Patent
Nishioka et al.

(10) Patent No.: US 6,195,469 B1
(45) Date of Patent: Feb. 27, 2001

(54) IMAGE PROCESSING APPARATUS FOR SHADING CORRECTION

(75) Inventors: Yukinori Nishioka; Tomoaki Umeda, both of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/140,753

(22) Filed: Aug. 25, 1998

(30) Foreign Application Priority Data

Aug. 29, 1997 (JP) .................................................. 9-233745

(51) Int. Cl.[7] .............................. G06K 9/40; G06K 9/20; H04N 1/40
(52) U.S. Cl. ........................... 382/274; 382/312; 358/461
(58) Field of Search .................................. 382/312, 254, 382/274, 167, 275; 348/251, 254; 358/461, 518, 519, 521

(56) References Cited

U.S. PATENT DOCUMENTS

| | | | |
|---|---|---|---|
| 3,919,473 | * 11/1975 | Cotter | 348/251 |
| 4,343,021 | * 8/1982 | Frame | 348/251 |
| 4,754,332 | * 6/1988 | Bergquist | 348/576 |
| 5,327,247 | * 7/1994 | Osborne et al. | 348/251 |
| 5,703,671 | * 12/1997 | Narita et al. | 355/32 |
| 5,724,456 | * 3/1998 | Boyack et al. | 382/274 |

FOREIGN PATENT DOCUMENTS 59-161177 * 9/1984 (JP) ................................ H04N/1/40

* cited by examiner

*Primary Examiner*—Thomas D. Lee
*Assistant Examiner*—Wen Peng Chen
(74) *Attorney, Agent, or Firm*—Sughrue, Mion, Zinn, Macpeak & Seas, PLLC

(57) ABSTRACT

An image processing apparatus includes a shading data calculating section for two-dimensionally mapping digitized data obtained by photo-electrically detecting uniform light converged by a lens by a two-dimensional sensor, thereby producing two-dimensional shading data whose density signal levels ellipse-like lower outwardly from a center pixel corresponding to the center of the lens to produce one-dimensional shading data from the density signal levels of the two-dimensional shading data on an arbitrary straight line extending outwardly from the center of the center pixel and calculating the angle $\theta$ between the straight line used for producing the one-dimensional shading data and the longer axis of the ellipse and the ratio of the longer axis to the shorter axis of the ellipse, a shading data memory for storing the one-dimensional shading data, the angle $\theta$ and the ratio of the longer axis to the shorter axis of the ellipse, a shading correction data producing section for producing shading correction data of each pixel based on the one-dimensional shading data, the angle $\theta$ and the ratio of the longer axis to the shorter axis of the ellipse stored in the shading data memory in accordance with distance between the center of the center pixel and itself and an angle between a straight line passing through the center of the center pixel and itself and the longer axis of the ellipse and a shading correcting section for correcting shading of image data based on the shading correction data. According to the thus constituted image processing apparatus, it is possible to simply correct the shading of an image produced by a two-dimensional sensor by converging onto the two-dimensional sensor light through a lens.

6 Claims, 6 Drawing Sheets

IMAGE PROCESSING APPARATUS FOR SHADING CORRECTION

BACKGROUND OF THE INVENTION

The present invention relates to an image processing apparatus and, particularly, to such an apparatus which can simply correct the shading of an image produced by a two-dimensional sensor by converging light onto the two-dimensional sensor through a lens.

DESCRIPTION OF THE PRIOR ART

A chemiluminescence detecting system is known, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information.

Further, a fluorescence system using a fluorescent substance as a labeling substance is known. According to this system, it is possible to study a genetic sequence, the expression level of a gene and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing a fluorescent dye or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescent light, detecting the released fluorescent light to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

In the case where such chemiluminescent light or fluorescent light is converged onto the photo-electrical surface of a CCD camera by a lens to take a picture of a chemiluminescent image or a fluorescent image, the amount of light transmitted through the periphery portion of the lens is smaller than that through other portions of the lens. Shading is therefore generated in the image produced by the CCD camera. This makes it necessary to correct the thus generated shading by data processing.

However, since the shading is generated two-dimensionally and the shading has to be corrected using two-dimensional correction data, the volume of the correction data inevitably becomes great so that a memory having great capacity is needed.

A similar problem occurs not only in the case of correcting the shading in a chemiluminescent image or a fluorescent image but also in the case of correcting shading in an image produced by a two-dimensional sensor by converging light by a lens onto the two-dimensional sensor.

SUMMARY OF THE INVENTION

It is therefore an object of the present invention is to provide an image processing apparatus which can simply correct the shading of an image produced by a two-dimensional sensor by converging light onto the two-dimensional sensor through a lens.

The above other objects of the present invention can be accomplished by an image processing apparatus comprising shading data calculating means for two-dimensionally mapping digitized data obtained by photo-electrically detecting uniform light converged by a lens by a two-dimensional sensor, thereby producing two-dimensional shading data whose density signal levels ellipse-like lower outwardly from a center pixel corresponding to the center of the lens to produce one-dimensional shading data from the density signal levels of the two-dimensional shading data on an arbitrary straight line extending outwardly from the center of the center pixel and calculating an angle $\theta$ between the straight line used for producing the one-dimensional shading data and a longer axis or a shorter axis of the ellipse and a ratio of the longer axis to the shorter axis of the ellipse or the shorter axis to the longer axis of the ellipse, shading data storing means for storing the one-dimensional shading data, the angle $\theta$ and the ratio of the longer axis to the shorter axis of the ellipse or the shorter axis to the longer axis of the ellipse, shading correction data producing means for producing shading correction data of each pixel based on the one-dimensional shading data, the angle $\theta$ and the ratio of the longer axis to the shorter axis of the ellipse or the shorter axis to the longer axis of the ellipse stored in the shading data storing means in accordance with distance between the center of the center pixel and itself and an angle between a straight line passing through the center of the center pixel and itself and the longer axis or the shorter axis of the ellipse and shading correcting means for correcting shading of image data based on the shading correction data.

The inventors of the present invention conducted a study for accomplishing the above object of the present invention and, as a result, found that shading is generated in an image produced by a two-dimensional sensor, the density signal levels of which ellipse-like lower from the center of the center pixel corresponding to the center of a lens depending on the convergence characteristics of the lens, and the shape and arrangement of the photo-electrical elements of the two-dimensional sensor. Therefore, according to the present invention, digitized data obtained by photo-electrically detecting uniform light converged by a lens by a two-dimensional sensor are two-dimensionally mapped by the shading data calculating means, thereby producing the two-dimensional shading data, and one-dimensional shading data is produced from the density signal levels of the two-dimensional shading data on an arbitrary straight line extending outwardly from the center of the center pixel. The angle θ between the straight line used for producing the one-dimensional shading data and the longer axis or the shorter axis of the ellipse and the ratio of the longer axis to the shorter axis of the ellipse or the shorter axis to the longer axis of the ellipse are calculated and are stored in the shading data storing means together with the one-dimensional shading data. Shading correction data for each pixel are produced by the shading correction data producing means based on the one-dimensional shading data, the angle θ and the ratio of the longer axis to the shorter axis of the ellipse or the shorter axis to the longer axis of the ellipse stored in the shading data storing means in accordance with distance between the center of the center pixel and itself and the angle between a straight line passing through the center of the center pixel and itself and the longer axis or the shorter axis of the ellipse and the shading of image data is corrected by the shading correcting means using the thus obtained shading correction data. Therefore, since the shading of image data can be corrected by storing only one-dimensional shading data, it is possible to obtain an image in which the shading has been corrected using a memory having small capacity.

In a preferred aspect of the present invention, the image processing apparatus further comprises bit number converting means for increasing the bit number of image data corrected by the shading correcting means.

Since the amount of light transmitted through the peripheral portion of the lens is small, the pixels corresponding to the peripheral portion of the lens are produced so as to have density signal levels lower than those they should inherently have. However, since the density signal levels thereof become higher owing to the shading correction, the density levels of the pixels recorded so as not to be saturated may be saturated and become impossible to record. Therefore, according the preferred aspect of the present invention, the bit number converting means for increasing the bit number of image data is provided to effectively prevent the density signal levels of pixels from being saturated and made impossible to record by the shading correction.

The above and other objects and features of the present invention will become apparent from the following description made with reference to the accompanying drawings.

DESCRIPTION OF THE PREFERRED EMBODIMENT

Figure 1:
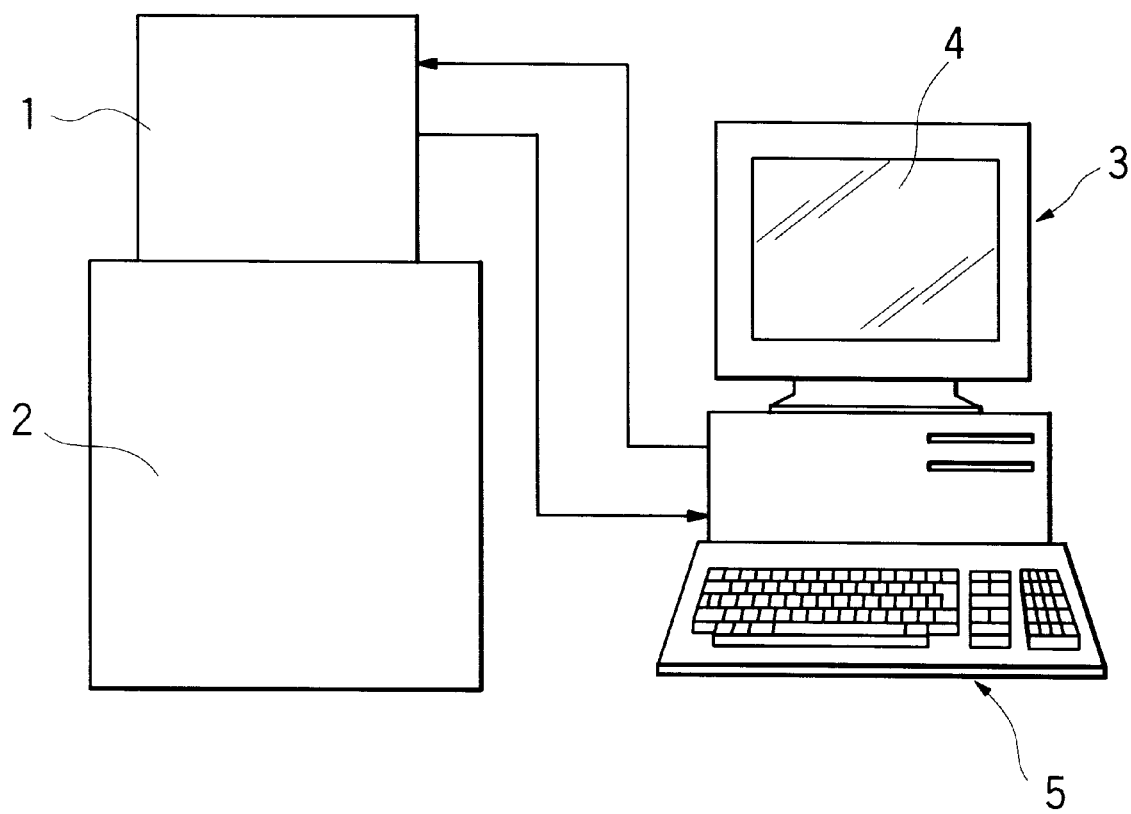
FIG. 1 is a schematic front view showing an image producing system including an image processing apparatus which is a preferred embodiment of the present invention.

As shown in FIG. 1, an image producing system includes a cooled CCD camera 1, a dark box 2 and a personal computer 3. The personal computer 3 is equipped with a CRT 4 and a keyboard 5.

Figure 2:
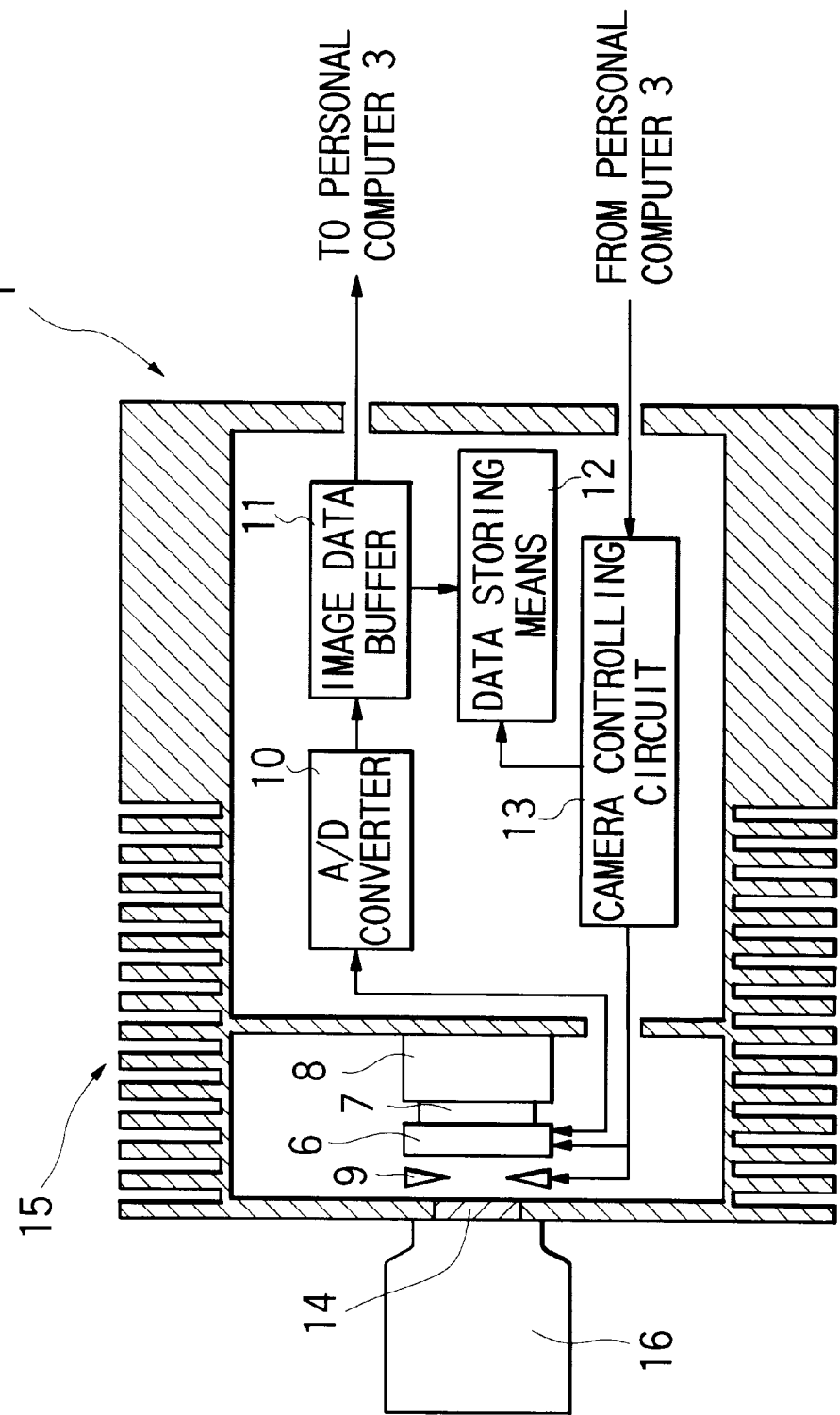
FIG. 2 is a schematic longitudinal cross sectional view showing a cooled CCD camera.

FIG. 2 is a schematic longitudinal cross sectional view showing the cooled CCD camera 1.

As shown in FIG. 2, the cooled CCD camera 1 includes a CCD 6, a heat transfer plate 7 made of metal such as aluminum, a Peltier element 8 for cooling the CCD 6, a shutter 9 disposed in front of the CCD 6, an A/D converter 10 for converting analog image data produced by the CCD 6 to digital image data, an image data buffer 11 for temporarily storing image digitized by the A/D converter 10, data storing means 12 for storing digital image data together with imaging conditions under which the image data was produced and a camera control circuit 13. An opening formed between the dark box 2 and the cooled CCD camera 1 is closed by a glass plate 14 and the periphery of the cooled CCD camera 1 is formed with heat dispersion fins 15 over substantially half its length for dispersing heat. The date storing means 12 is controlled by the camera control circuit 13 so as to be accessible.

A camera lens 16 disposed in the dark box 2 is mounted on the front surface of the glass plate 14 disposed in the cooled CCD camera 1.

Figure 3:
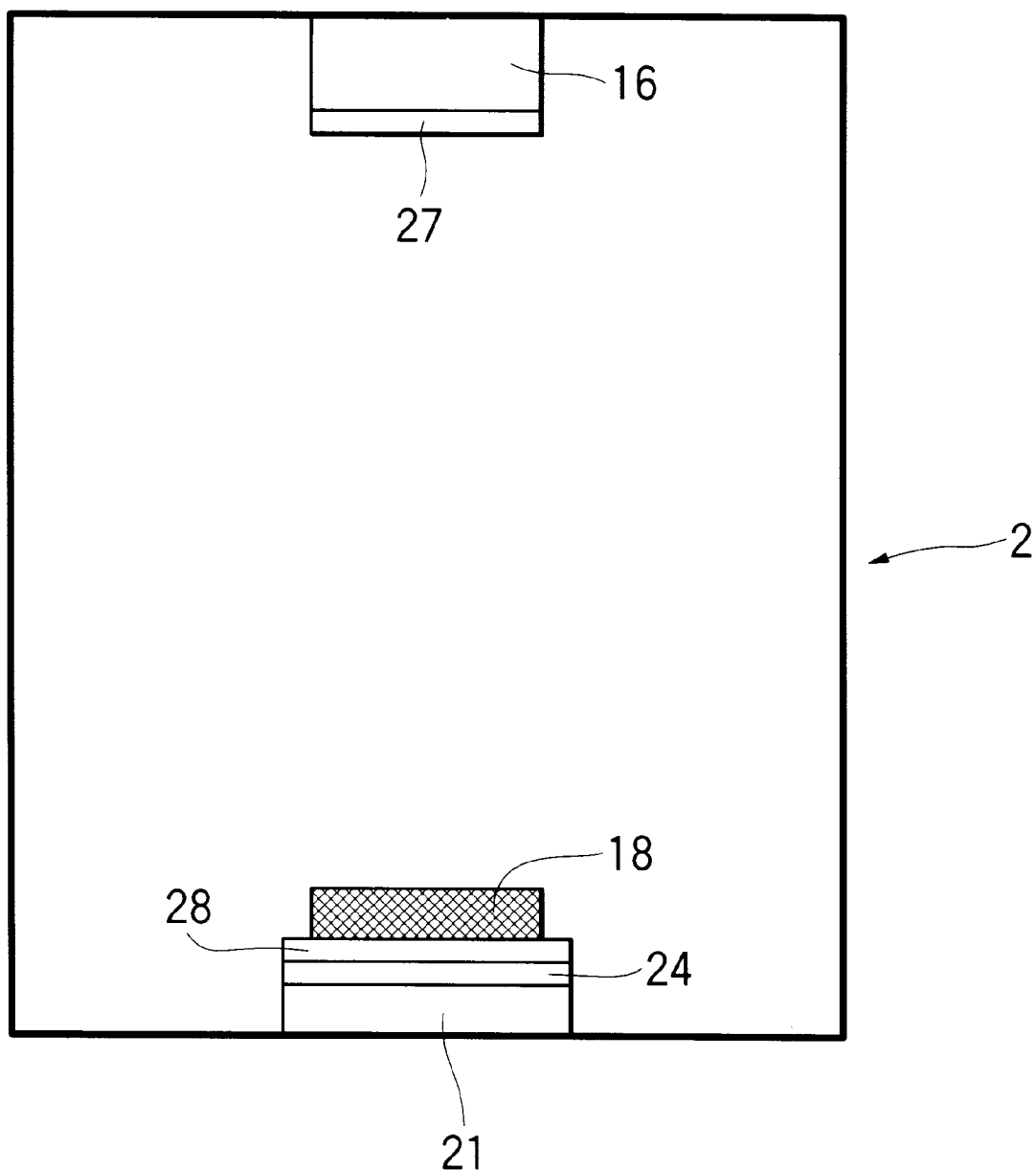
FIG. 3 is a schematic vertical cross sectional view showing a dark box.

FIG. 3 is a schematic vertical cross sectional view showing a dark box 2.

As shown in FIG. 3, the dark box 2 is equipped with a blue light emitting diode stimulating ray source 21 for emitting a stimulating ray whose center wavelength is 450 nm. A filter 24 is adhered to the upper surface of the blue light emitting diode stimulating ray source. The filter 24 cuts light of wavelengths other than one in the vicinity of 450 nm and harmful to the stimulation of a fluorescent substance and transmit light having a wavelength in the vicinity of 450 nm. A filter 27 for cutting the stimulating ray having a wavelength in the vicinity of 450 nm is detachably provided on the front surface of the camera lens 16. A diffusion plate 28 is mounted on the upper surface of the filter 24 for diffusing a stimulating ray emitted from the blue light emitting diode stimulating ray source 21.

Figure 4:
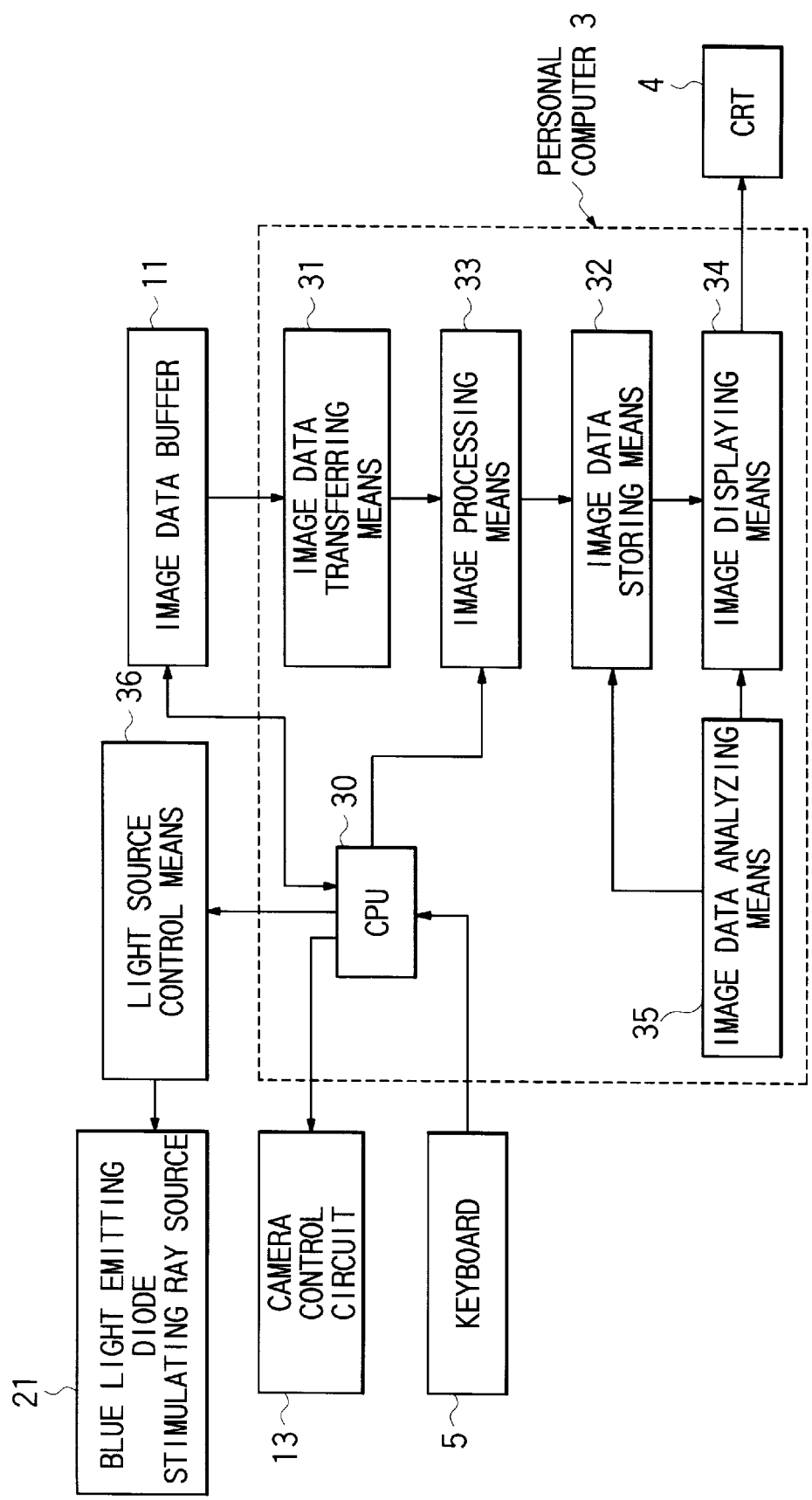
FIG. 4 is a block diagram of a personal computer and peripheral devices thereof.

FIG. 4 is a block diagram of the personal computer 3 and peripheral devices thereof.

As shown in FIG. 4, the personal computer 3 includes a CPU 30 for controlling the exposure of the cooled CCD camera 1, an image data transferring means 31 for reading the image data produced by the cooled CCD camera 1 from the image data buffer 11, an image processing means 33 for effecting image processing on the image data read out by the image transferring means 31 and storing them in an image data storing means 32, an image displaying means 34 for displaying a visual image on the screen of the CRT 4 based on the image data stored in the image data storing means 32, and an image data analyzing means 35 for analyzing the image data stored in the image data storing means 32. The blue light emitting diode stimulating ray source 21 is controlled by a light source control means 36 and an instruction signal can be input via the CPU 30 to the light source control means 36 through the keyboard 5. The CPU 30 is constituted so as to output various signals to the camera controlling circuit 13 of the cooled CCD camera 1. The image data storing means 32 is constituted so as to store image data together with imaging conditions under which the image data was produced and is accessible by the CPU 30.

The image processing apparatus according to this embodiment is constituted so as to detect fluorescent light emitted from an image carrier carrying a fluorescent image and a chemiluminescent light released by the contact of a chemiluminescent substance and a labeling substance and produce a fluorescent image and a chemiluminescent image and produces a visible image by detecting fluorescent light emitted from an image carrier carrying a fluorescent image in the following manner. As termed in this specification, an image carrier carrying an image of a fluorescent substance includes an image carrier carrying an image of a specimen labeled with a fluorescent substance and an image carrier carrying an image of a fluorescent substance obtained by combining enzyme with a labeled specimen, contacting the enzyme and a fluorescent substrate, thereby changing the fluorescent substrate to a fluorescent substance capable of emitting fluorescent light.

An image carrier 18, which is a specimen, is first placed on the diffusing plate 28 and the lens focus is adjusted by the user. After the dark box 2 has been closed, the user inputs an exposure start signal through the keyboard 5. The blue light emitting diode stimulating ray source 21 is turned on by the light source control means 36, thereby emitting a stimulating ray toward the image carrier 18 placed on the diffusion plate 28. At the same time, the exposure start signal is input through the CPU 30 to the camera controlling circuit 13 of the cooled CCD camera 1 and the shutter 9 is opened by the camera controlling circuit 13, thereby starting the exposure of the CCD 6.

Light components of wavelengths not in the vicinity of 450 nm are cut by the filter 27 from the stimulating ray emitted from the blue light emitting diode stimulating ray source 21. As a result, the fluorescent substance contained in the image carrier 18 is stimulated by light having a wavelength in the vicinity of 450 nm, thereby emitting fluorescent light.

The fluorescent light emitted from the fluorescent substance contained in the image carrier 18 impinges on the photo-electrical surface of a photo-electrical sensor of the CCD 6 through the filter 27 and the camera lens 16 and forms an image thereon. The photo-electrical sensor of the CCD 6 receives light of the thus formed image and accumulates it in the form of electric charges therein. Since the stimulating ray having a wavelength in the vicinity of 450 nm is cut by the filter 27, only fluorescent light emitted from a fluorescent substance contained in the image carrier 18 is received by the CCD 6.

When a predetermined exposure time has passed, the CPU 30 outputs an exposure completion signal to the camera controlling circuit 13 of the cooled CCD camera 1. When the camera controlling circuit 13 receives the exposure completion signal from the CPU 30, it transfers the analog image data accumulated in the CCD 6 in the form of electric charge to the A/D converter 10 to cause the A/D converter 10 to digitize the image data to digital image data of fourteen bits and temporarily store the thus digitized image data in the image data buffer 11 together with the imaging conditions. The image data and the imaging conditions under which the image data was produced temporarily stored in the image data buffer 11 are input in the data storing means 12 and stored therein. At the same time, the CPU 30 outputs a data transfer signal to the image data transferring means 31 to cause it to read out the digital image data temporarily stored in the image data buffer 11 of the cooled CCD camera 1 together with the imaging conditions and to input them to the image processing means 33.

However, the intensity of fluorescent light emitted from the image carrier 18 and converged onto the photo-electrical surface of the photo-electrical sensor of the CCD 6 by the camera lens 16 becomes higher toward the center of the camera lens 16 since the amount of light transmitted through the peripheral portion of the camera lens 16 is smaller and, therefore, two-dimensional shading is generated in the thus produced image data input to the image processing means 33. Accordingly, prior to displaying a fluorescent image on the screen of the CRT 4 based on the image data, it is indispensable to effect shading correction processing on the image data.

In this embodiment, therefore, correction data for correcting shading have been produced and stored in the image processing means 33 prior to reading a fluorescent image and when the image data is input, the image processing means 33 effects shading correction processing on the image data in accordance with the correction data for correcting shading and stores the corrected image data in the image data storing means 32. Afterward, when the user inputs an image production signal through the keyboard 5, the image data stored in the image data storing means 32 are read out by the image displaying means 34 and a fluorescent image is displayed on the screen of the CRT 4 based on the read-out image data.

Since the shading generated by the camera lens 16 is two-dimensional, two-dimensional correction data are necessary for correcting the shading. However, a memory having great capacity is required for storing two-dimensional correction data and this is uneconomical. Therefore, the inventors focused on the fact that the shading generated by the camera lens 16 in the image data are theoretically symmetrical with respect to the pixel corresponding to the center of the camera lens 16 and that shading correction data required for each pixel vary in accordance with distance from the center of the center pixel corresponding to the center of the camera lens 16. Thus, they found that the shading of image data can be corrected using a memory having small capacity by obtaining one-dimensional image data for storage in the memory and correcting the shading of each pixel of the image data in accordance with distance from the center of the center pixel corresponding to the center of the camera lens 16 using the thus stored shading correction data. However, as a result of the inventors' further investigation, it was found that when image data are produced by receiving light converged by the camera lens 16 by the photo-electrical sensor, the density signal level of each pixel of the image data is lowered not circularly but ellipse-like with respect to the center of the camera lens 16 due to the shape and arrangement of individual photo-electrical elements of the photo-electrical sensor of the CCD 6.

Therefore, in this embodiment, light emitted from the blue light emitting diode stimulating ray source 21, transmitted through the filter 24 and diffused by the diffusion plate 28 is converged onto the photo-electrical surface of the photo-electrical sensor of the CCD 6 and photo-electrically converted to obtain image data. The thus obtained image data are two-dimensionally mapped to produce two-dimensional shading data whose density signal levels are ellipse-like lowered outwardly from the center pixel corresponding to the center of the camera lens 16. One-dimensional shading data is obtained based on the two-dimensional shading data along the straight line outwardly extending from the center of the center pixel and the angle θ between the straight line used for obtaining the one-dimensional shading data and the longer axis of the ellipse and the ratio of the longer axis to the shorter axis of the ellipse are calculated, thereby storing the one-dimensional shading data, the angle θ and the ratio of the longer axis to the shorter axis of the ellipse in a memory. Shading correction data for each pixel are produced based on the one-dimensional shading data, the angle θ and the ratio of the longer axis to the shorter axis of the ellipse stored in the memory in accordance with the distance between each pixel and the center of the center pixel and the angle between a straight line drawn from the center of the center pixel and the longer axis of the ellipse and the density signal level of each pixel of the image data is corrected based on the thus produced shading correction data.

Figure 5:
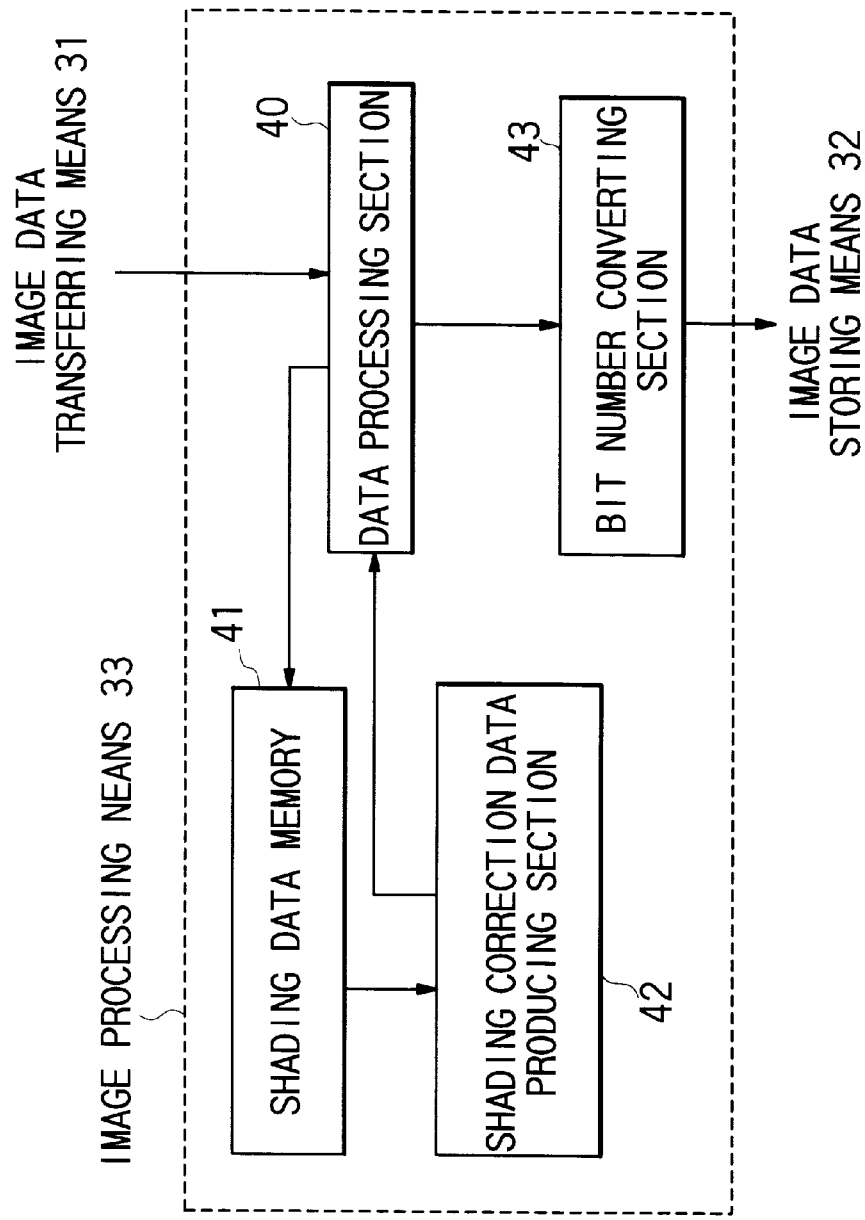
FIG. 5 is a block diagram showing the details of an image processing means.

FIG. 5 is a block diagram showing the details of the image processing means 33.

As shown in FIG. 5, the image processing means 33 includes a data processing section 40 for effecting image processing on the input image data, a shading data memory 41 for storing shading data, the angle θ and the ratio of the longer axis to the shorter axis of the ellipse, a shading correction data producing section 42 for producing shading correction data based on the shading data, the angle θ and the ratio of the longer axis to the shorter axis of the ellipse stored in the shading data memory 41 in accordance with the distance between each pixel and the center of the pixel corresponding to the center of the camera lens 16 and the angle between a straight line drawn from the center of the center pixel and the longer axis of the ellipse, and a bit number converting section 43 for converting the bit number of shading-corrected image data from 14 bits to 16 bits so as to prevent the density signal levels of the pixels which have been produced so that the density signal levels thereof cannot be saturated from being saturated by the shading correction.

The thus constituted image processing means 33 effects shading correction in the following manner in the case of producing a fluorescent image by exciting an image carrier 18 using the blue light emitting diode stimulating ray source 21.

After the filter 27 has been removed, if the user inputs through the keyboard 5 an instruction requesting that the image carrier 18 be excited using the blue light emitting diode stimulating ray source 21 and that shading correction data be produced, the CPU 30 outputs a shading correction data production starting signal to the light source control means 36 to cause it to turn on the blue light emitting diode stimulating ray source 21. At the same time, the shading correction data production starting signal is input through the CPU 30 to the camera controlling circuit 13 of the cooled CCD camera 1, whereby the camera controlling circuit 13 opens the shutter 9 to start the exposure of the CCD 6.

Light components of wavelengths not in the vicinity of 450 nm are cut by the filter 24 from the stimulating ray emitted from the blue light emitting diode stimulating ray source 21 and the light passes through the diffusion plate 28, thereby being converted to uniform light and is converged onto the photo-electrical surface of the photo-electrical sensor of the CCD 6. The photo-electrical sensor of the CCD 6 receives the thus converged light and accumulates it as electrical charge.

When a predetermined exposure time has passed, the CPU 30 outputs a shading correction data production completion signal to the camera controlling circuit 13 of the cooled CCD camera 1. When the camera controlling circuit 13 receives the shading correction data production completion signal from the CPU 30, it transfers the analog image data accumulated in the CCD 6 in the form of electric charge to the A/D converter 10 to cause the A/D converter 10 to digitize the image data to digital image data of fourteen bits and temporarily store the thus digitized image data in the image data buffer 11 together with the kind of light source used for producing the image data. The two-dimensional shading data and the kind of light source temporarily stored in the image data buffer 11 are input to the data storing means 12 and stored therein. At the same time, the CPU 30 outputs a data transfer signal to the image data transferring means 31 to cause it to read out the two-dimensional shading data temporarily stored in the image data buffer 11 of the cooled CCD camera 1 together with the kind of light source and to input them to the data processing section 40 of the image processing means 33.

Figure 6:
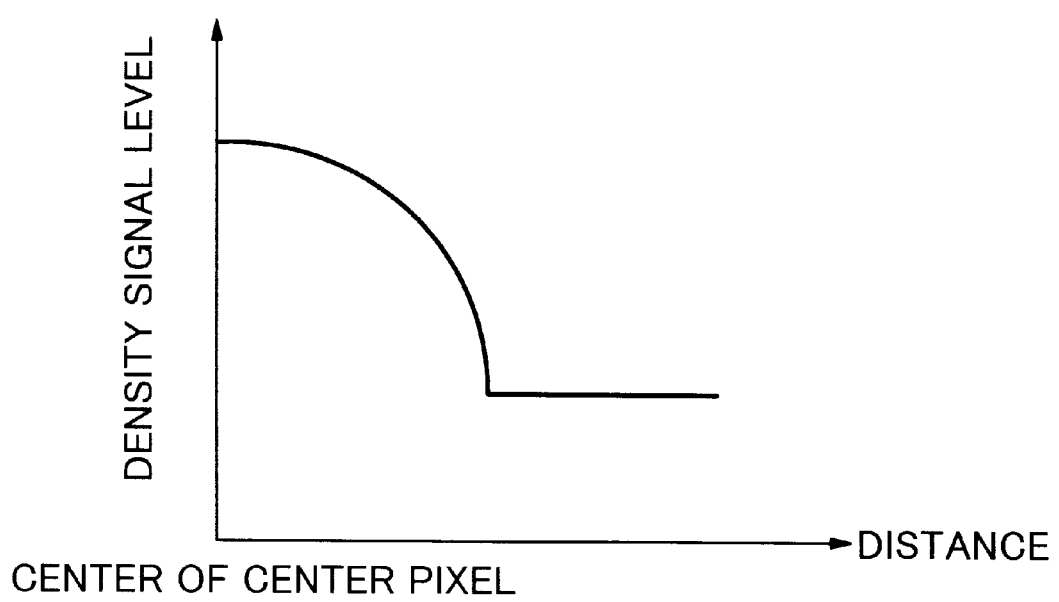
FIG. 6 is a diagram showing one example of one-dimensional shading data produced along the longitudinal axis of an ellipse from the center coordinate.

The data processing section 40 of the image processing means 33 two-dimensionally maps the input two-dimensional shading data to produce two-dimensional shading data whose density signal levels are lowered from the center pixel corresponding to the center of the camera lens 16 outwardly. Since the photo-electrical sensor of the CCD 6 is rectangular, the thus mapped two-dimensional shading data are also of rectangular shape. The data processing section 40 then produces one-dimensional shading data from the density signal levels of the two-dimensional shading data on a straight line diagonally extending from the center of the center pixel, calculates the angle θ between the straight line used for producing the one-dimensional shading data and the longer axis of the ellipse and the ratio of the longer axis to the shorter axis of the ellipse and stores them in the shading data memory 41 together with the kind of light source used for producing the two-dimensional shading data, namely, the blue light emitting diode stimulating ray source 21. FIG. 6 is a diagram showing one example of the one-dimensional shading data produced by the data processing section 40.

When the image data obtained by exciting the image carrier 18 with the stimulating ray emitted from the blue light emitting diode stimulating ray source 21 and photo-electrically reading fluorescent light emitted from the image carrier 18 upon being excited by the photo-electrical sensor of the CCD 6 are input to the data processing section 40 of the image processing means 33, the data processing section 40 outputs a correction data production signal to the shading correction data producing section 42 and causes it read out the one-dimensional shading data, the angle θ and the ratio of the longer axis to the shorter axis of the ellipse stored in the shading data memory 41.

The shading correction data producing section 42 produces data for correcting the shading of each pixel based on the one-dimensional shading data, the angle θ and the ratio of the longer axis to the shorter axis of the ellipse stored in the shading data memory 41 in accordance with the distance from the center of the pixel corresponding to the center of the camera lens 16 to each pixel constituting the image data and the angle between a straight line drawn from the center of the pixel corresponding to the center of the camera lens 16 to each pixel and the longer axis of the ellipse and outputs them to the data processing section 40.

The data processing section 40 corrects the shading of the input image data by multiplying the data for correcting the shading of each pixel produced by the shading correction data producing section 42 by the density signal level of the corresponding pixel and outputs the corrected image data to the bit number converting section 43.

Since the amount of light transmitted through the peripheral portion of the camera lens 16 is small, the pixels corresponding to the peripheral portion of the camera lens 16 are produced so as to have density signal levels lower than those they should inherently have. However, since the density signal levels thereof become higher owing to the shading correction, the density levels of the pixels recorded so as not to be saturated may become saturated and impossible to record. Therefore, in this embodiment, image data on which the shading correction has been effected are input to the bit number converting section 43 where the shading corrected image data of fourteen bits are converted to image data of sixteen bits, thereby preventing the density signal levels of the pixels from being saturated and made impossible to record due to the shading correction. The thus bit number-converted image data are output from the bit number converting section 43 to the image data storing means 32 and stored therein.

After the shading correction has been effected on the image data and the image data have been stored in the image data storing means 33 in this manner, if the user inputs an image production signal through the keyboard 5, the image displaying means 34 reads out the image data stored in the image data storing means 32 and a fluorescent image is displayed on the screen of the CRT 4 based on the read-out image data.

Further, if the user inputs an analysis signal through the keyboard 5, the image data analyzing means 35 reads out the image data and the imaging conditions under which the image data were produced from the image data storing means 32 and analyzes of the image data specified by the user. The result of the analysis is displayed on the screen of the CRT 4.

In the case of producing a chemiluminescent image, a chemiluminescent image is produced by photo-electrically detecting chemiluminescent emission emitted from an image carrier 18 by the contact of a chemiluminescent substance and a labeling substance. Therefore, similarly to the production of a fluorescent image using the blue light emitting diode stimulating ray source 21 which is a transmission-type light source, one-dimensional shading data, the angle θ between the straight line used for producing the one-dimensional shading data and the longer axis of the ellipse and the ratio of the longer axis to the shorter axis of the ellipse are obtained and stored in the shading data memory 41 and the shading correction is performed based on the one-dimensional shading data, the angle θ and the ratio of the longer axis to the shorter axis of the ellipse stored in the shading data memory 41. Alternatively, if one-dimensional shading data produced using the blue light emitting diode stimulating ray source 21, the angle θ and the ratio of the longer axis to the shorter axis of the ellipse have been already stored in the shading data memory 41, the shading correction is performed using data stored in the shading data memory 41.

When a chemiluminescent image is to be produced, after one-dimensional shading data, the angle θ between the straight line used for producing the one-dimensional shading data and the longer axis of the ellipse and the ratio of the longer axis to the shorter axis of the ellipse have been obtained and stored in the shading data memory 41, chemiluminescent emission emitted from an image carrier 18 is photo-electrically detected via the camera lens 16 by the photo-electrical sensor of the CCD 6 and digitized to produce image data similarly to the production of a fluorescent image except that the filter 27 is removed, that the image carrier 18 for emitting chemiluminescent emission is set in place and that chemiluminescent emission is detected while the blue light emitting diode stimulating ray source 21 is kept off. The image processing means 33 effects the shading correction on the thus obtained image data using the one-dimensional shading, the angle θ and the ratio of the longer axis to the shorter axis of the ellipse already stored in the shading data memory 41, similarly to the production of a fluorescent image, and after the bit number of the image data has been converted from fourteen bits to sixteen bits, the image data is stored in the image data storing means 33. Afterward, if the user inputs an image production signal through the keyboard 5, the image data stored in the image data storing means 33 are read out by the image displaying means 34 and a chemiluminescent image is displayed on the screen of the CRT 4 based on the read out image data.

According to the above described embodiment, the shading of image data can be corrected by storing only one-dimensional shading data, the angle θ between the straight line used for producing the one-dimensional shading data and the longer axis of the ellipse and the ratio of the longer axis to the shorter axis of the ellipse. Therefore, the shading of image data can be corrected using a memory having small capacity that is low in cost. Further, according to the above described embodiment, since the bit number of the image data produced with fourteen bits and shading-corrected is converted to sixteen bits by the bit number converting section 43, the density signal levels of pixels produced without being saturated can be prevented from being saturated and made impossible to record by effecting shading correction thereon.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, one-dimensional shading data, the angle θ between the straight line used for producing the one-dimensional shading data and the longer axis of the ellipse and the ratio of the longer axis to the shorter axis of the ellipse are stored in the shading data memory 41 and the shading correction of image data is effected based thereon. However, instead of the ratio of the longer axis to the shorter axis of the ellipse, the ratio of the shorter axis to the longer axis of the ellipse can be stored and the shading correction of image data be effected based on the stored data.

Further, in the above described embodiment, although the angle between the straight line used for producing the one-dimensional shading data and the longer axis of the ellipse is obtained and stored in the shading data memory 41, the angle between the straight line used for producing the one-dimensional shading data and the shorter axis of the ellipse can be obtained and stored in the shading data memory 41 and the shading of image data be corrected using the stored data.

Furthermore, in the above described embodiment, although the bit number converting section 43 is provided for converting the bit number of the shading-corrected image data from fourteen bits to sixteen bits, it suffices to increase the bit number of image data and it is not absolutely necessary to achieve the increase by producing image data with fourteen bits and converting the bit number of the image data to sixteen bits. Further, it is not absolutely necessary to provide the bit number converting section 43 in order to increase the bit number of image data.

Further, although the above described embodiment was explained regarding the shading correction of a fluorescent image and a chemiluminescent image produced by the CCD 6, the present invention can be widely applied to the shading correction of images produced by two-dimensional sensors other than a CCD such as a MOS-type sensor.

Moreover, in the above described embodiment, although the cooled CCD camera 1 is used, in cases where weak light such as fluorescent light or chemiluminescent emission need not be detected, it is possible to use a CCD camera having no cooling means to produce image data and to effect shading correction thereon.

Further, in the above described embodiment, although the first blue light emitting diode stimulating ray source 21 for emitting a stimulating ray whose center wavelength is 450 nm is used, a light emitting diode stimulating ray source for emitting a stimulating ray whose center wavelength is in the range between 400 nm and 700 nm may be selected and employed depending on the kind of a fluorescent substance.

Furthermore, in the above described embodiment, the image producing system includes the detachable filter 27 for cutting a stimulating ray having a wavelength in the vicinity of 450 nm and is constituted so as to detect very weak chemiluminescent emission by removing the filter 27 and produce a chemiluminescent image. However, it may be constituted so as to produce only a fluorescent image by fixing the filter 27 to the front surface of the camera lens 16.

Moreover, in the above described embodiment, although the blue light emitting diode stimulating ray source 21 is provided, in the case where the image producing system is used to detect chemiluminescent emission and produce only a chemiluminescent image, the blue light emitting diode stimulating ray source 21 is unnecessary and the filter 27 is also not necessary.

Further, in the above described embodiment, the cooled CCD camera 1 is formed with heat dispersion fins 15 over substantially half its length for dispersing heat released from Peltier element 8, it is possible to form the heat dispersion fins 15 on the periphery of the cooled CCD camera 1 over its entire length and the arrangement of the heat dispersion fin 15 on the periphery of the cooled CCD camera 1 may be arbitrarily determined.

Furthermore, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means. For example, although in the above described embodiment the data processing section 40 performs the mapping of two-dimensional shading data and production of one-dimensional shading data as well as shading correction of image data using shading correction data, the mapping of two-dimensional shading data and production of one-dimensional shading data, and shading correction of image data using shading correction data may be performed by separate means.

According to the present invention, it is possible to provide an image processing apparatus which can simply correct the shading of an image produced by a two-dimensional sensor by converging onto the two-dimensional sensor light through a lens.

What is claimed is:

1. An image processing apparatus comprising shading data calculating means for two-dimensionally mapping digitized data obtained by photo-electrically detecting uniform light converged by a lens by a two-dimensional sensor, thereby producing two-dimensional shading data whose density signal levels lower outwardly and elliptically from a center pixel of an ellipse corresponding to the center of the lens to produce one-dimensional shading data from the density signal levels of the two-dimensional shading data on an arbitrary straight line extending outwardly from the center of the center pixel and calculating an angle θ between the straight line used for producing the one-dimensional shading data and a longer axis or a shorter axis of the ellipse and a ratio of the longer axis to the shorter axis of the ellipse or the shorter axis to the longer axis of the ellipse, shading data storing means for storing the one-dimensional shading data, the angle θ and the ratio of the longer axis to the shorter axis of the ellipse or the shorter axis to the longer axis of the ellipse, shading correction data producing means for producing shading correction data of each pixel based on the one-dimensional shading data, the angle θ and the ratio of the longer axis to the shorter axis of the ellipse or the shorter axis to the longer axis of the ellipse stored in the shading data storing means in accordance with distance between the center of the center pixel and said each pixel and an angle between a straight line passing through the center of the center pixel and said each pixel and the longer or the shorter axis of the ellipse and shading correcting means for correcting shading of image data based on the shading correction data.

2. An image processing apparatus in accordance with claim 1 wherein the image processing apparatus further comprises bit number converting means for increasing the bit number of image data corrected by the shading correcting means.

3. An image processing apparatus, comprising:
   a lens;
   a photo-electric sensor which receives light from said lens;
   a shading correction processor which two-dimensionally maps digitized data obtained from said photo-electric sensor, thereby producing two-dimensional shading data whose density signal levels are lowered outwardly and elliptically from a center pixel of an ellipse corresponding to the center of the lens, said processor further producing one-dimensional shading data from the density signal levels of the two-dimensional shading data based on an arbitrary straight line extending outwardly from the center of the center pixel, and calculating an angle θ between the straight line used for producing the one-dimensional shading data and a longer axis or a shorter axis of the ellipse;
   a shading data memory which stores the one-dimensional shading data and the angle θ;
   a shading correction data producer which produces shading correction data for each pixel of said photo-electric sensor based on the one-dimensional shading data and the angle θ stored in said shading data memory, the shading correction data being produced in accordance with a distance between the center of the center pixel and said each pixel of said photo-electric sensor and an angle defined between a straight line passing through the center of the center pixel and said each pixel of said photo-electric sensor and the longer or the shorter axis of the ellipse; and
   a shading corrector which corrects the shading of image data based on the shading correction data.

4. The image processing apparatus according to claim 3, further comprising a bit number converter which increases a bit number of image data corrected by the shading corrector.

5. The image processing apparatus according to claim 3, wherein said shade correction processor further produces the one-dimensional shading data in accordance with a ratio of a longer axis to the shorter axis of the ellipse to a shorter axis of the ellipse or an inverse of the ratio, and wherein said shading correction data producer further produces the shading correction data in accordance with the ratio of the longer axis to the shorter axis of the ellipse or an inverse of the ratio.

6. The image processing apparatus according to claim 5, further comprising a bit number converter which increases a bit number of image data corrected by the shading corrector.

* * * * *